US006312333B1

(12) United States Patent
Acres

(10) Patent No.: US 6,312,333 B1
(45) **Date of Patent: *Nov. 6, 2001**

(54) NETWORKED CREDIT ADJUST METER FOR ELECTRONIC GAMING

(75) Inventor: John F. Acres, Corvallis, OR (US)

(73) Assignee: Acres Gaming Incorporated, Las Vegas, NV (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,437

(22) Filed: Jul. 24, 1998

(51) Int. Cl.[7] .............................. A63F 13/00; A63F 9/24; G06F 17/00; G06F 19/00

(52) U.S. Cl. ................................ 463/25; 463/26; 463/27; 463/28; 463/29; 273/138.1; 273/139; 273/141 R; 273/142 R; 273/460

(58) Field of Search .................................... 463/25, 1, 24, 463/26, 27, 28, 29, 30; 273/142 R, 143 A, 138.1, 148 R, 142 H, 139, 460, 141 R

(56) References Cited

U.S. PATENT DOCUMENTS 4,283,709 8/1981 Lucero et al. .
4,991,848 * 2/1991 Greenwood et al. ............ 273/143 R
5,326,104 7/1994 Pease et al. .
5,371,345 12/1994 LeStrange et al. .
5,496,032 3/1996 Okada .
5,505,461 4/1996 Bell et al. .
5,611,730 * 3/1997 Weiss ................................ 463/20 X
5,674,128 * 10/1997 Holch et al. ....................... 463/42 X
5,770,533 * 6/1998 Franchi .............................. 463/42 X
5,800,269 * 9/1998 Holch et al. ....................... 463/42 X
5,816,918 * 10/1998 Kelly et al. ............................ 463/16
5,823,879 * 10/1998 Goldberg et al. ...................... 463/43

* cited by examiner

*Primary Examiner*—Valencia Martin-Wallace
*Assistant Examiner*—Binh-An D. Nguyen
(74) *Attorney, Agent, or Firm*—Marger, Johnson & McCollom, P.C.

(57) ABSTRACT

A method for automatically awarding credits to a player on a gaming machine network adjusted for tax codes. The network comprises a plurality of gaming machines on which a primary game is played, a bonus server implementing the credit adjustment, and a database containing player information such as tax status, country of residence, tax rate, electronic signature, etc. Play is allowed to continue on the gaming machines and any bonus amount won on the machines are detected. If the bonus amount meets a preestablished threshold, currently set by IRS regulations as any award equal to or greater than $1200, then the gaming machine is locked up until the actual awarded amount can be determined. If the player record is complete and the proper tax amount is included, then the bonus award can be adjusted and a withholding calculated to yield a reduced award amount. An authorization signal is sent through the network to the gaming machine that credits the reduced amount to the games credit meter. The game is then unlocked and play can commence in the normal manner whereby the player can gamble with the winnings without reinserting any handpay into the machine.

14 Claims, 3 Drawing Sheets

NETWORKED CREDIT ADJUST METER FOR ELECTRONIC GAMING

BACKGROUND OF THE INVENTION

This invention relates generally to electronic gaming machines interconnected by a computer network and more particularly to a method and apparatus for crediting winnings to such machines adjusted for tax laws.

IRS regulations require that a player complete a W2-G form declaring certain winnings for tax purposes. Currently, if a player wins a bonus award that exceeds a certain threshold (currently set at $1,200 or more), then that player must fill out the W2-G form prior to being awarded an amount adjusted for taxes. Casinos are required by law to enforce these regulations.

Enforcement on slot machines is typically accomplished by programming the games to automatically lock up on any award of $1,200 or more and require that the jackpot be manually paid. This lockup gives the casino an opportunity to cause the player to complete the W2-G form. The award is not paid until the player signs the form as required. The casino then retrieves the jackpot amount in cash or tokens and pays the customer. A casino representative would then “clear” the machine by turning a reset key on the side of the machine and normal play is continued.

Obtaining cash to pay the customer requires that certain procedures be followed to insure security and propriety. These procedures typically take between about twenty to thirty minutes to complete. Unfortunately the player is forced to wait while this process occurs.

Another drawback to paying players directly involves the fact that such cash awards occur outside of the networked environment. More recently, gaming machines within casinos are networked together to allow networked bonusing and account control. U.S. Pat. No. 5,572,882 to Acres et al. (“the ’882 patent”), for instance, discloses a card reader installed at each gaming machine. The ’882 patent is assigned to the assignee of the present application and is incorporated herein by reference for all purposes. The card reader disclosed in the ’882 patent reads a player identification card issued to customers of the casino and maintains an account balance at a central database within the casino. Thus, a customer could move from machine to machine without having to cash-out and reinsert large amounts of cash into the new machine. By hand-paying the customer, the account information is lost and the player would have to reinsert the cash into the machine.

On machines with denominations of $1 and less, jackpots of $1,200 and above occur rarely. On $5 games the problem is more noticeable. At $25 and especially $100 and above, awards of $1,200 and more are so frequent that customer enjoyment is severely impacted.

Accordingly, a need remains for an improved system for awarding bonuses within casinos that comply with current tax laws.

SUMMARY OF THE INVENTION

It is, therefore, an object of the invention to allow winnings adjusted for any tax laws to be credited directly to the gaming machines.

Another object of the invention is to more fully automate the reporting of large award wins for tax purposes.

To achieve these objects, the invention comprises a method for automatically awarding credits to a player on a gaming machine network adjusted for tax codes. The network comprises a plurality of gaming machines on which a primary game is played, a bonus server implementing the credit adjustment, and a database containing player information such as tax status, country of residence, tax rate, electronic signature, etc. Play is allowed to continue on the gaming machines and any bonus amount won on the machines are detected. If the bonus amount meets a preestablished threshold, currently set by IRS regulations as any award equal to or greater than $1200, then the gaming machine is locked up until the actual awarded amount can be determined. If the player record is complete and the proper tax amount is included, then the bonus award can be adjusted and a withholding calculated to yield a reduced award amount. An authorization signal is sent through the network to the gaming machine that credits the reduced amount to the games credit meter. The game is then unlocked and play can commence in the normal manner whereby the player can gamble with the winnings without reinserting any handpay into the machine.

The benefits of the present invention are three-fold. First, customer waiting time is drastically reduced. A W2-G form can be completed in 3–5 minutes. Under the conventional system, manual payouts were performed at the cashier’s booth typically far removed from the gaming machine. Accordingly, the customer is happier and is back playing his or her favorite game much more quickly. Second, paperwork, security concerns and casino labor requirements are greatly reduced because of automation performed according to the invention. Finally, the player has credits applied directly on the gaming machine. There is no need to play the jackpot won back into the games. This enhances player enjoyment, speeds their play and reduces the likelihood that he or she will quit playing.

The foregoing and other objects, features and advantages of the invention will become more readily apparent from the following detailed description of a preferred embodiment of the invention which proceeds with reference to the accompanying drawings.

DETAILED DESCRIPTION

Figure 1:
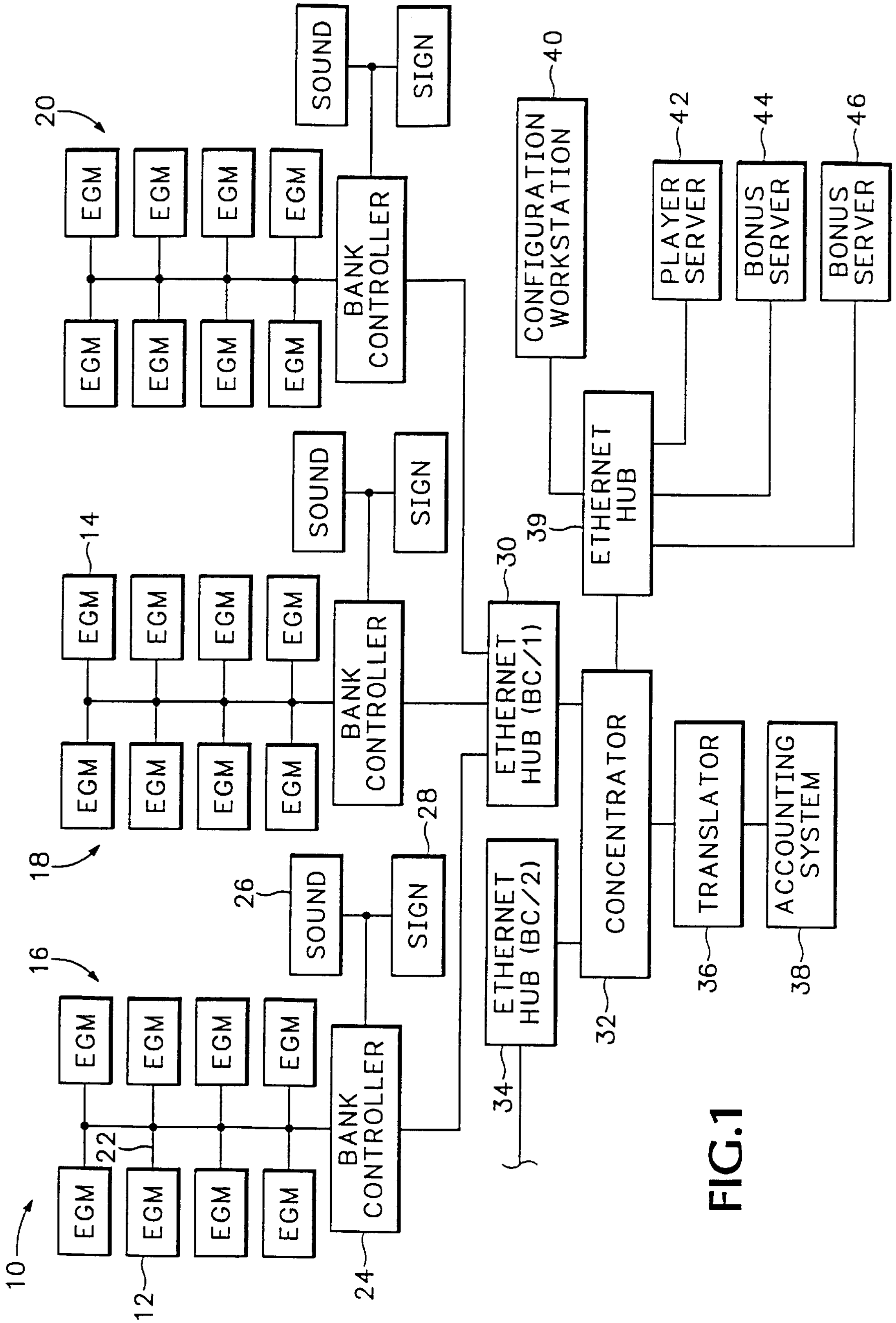
FIG. 1 is a schematic diagram of a plurality of electronic gaming machines interconnected by a computer network to a host computer in accordance with the present invention.

Turning now to FIG. 1, indicated generally at 10 is a schematic diagram illustrating electronic gaming machines (EGMs), like EGMs 12, 14, interconnected by a computer network. Included therein are three banks, indicated generally at 16, 18, 20, of EGMs. Each EGM is connected via a network connection, like connection 22, to a bank controller 24.

In the present embodiment of the invention, each bank controller comprises a processor that facilitates data communication between the EGMs in its associated bank and the other components on the network. The bank controller also includes a CD ROM drive for transmitting digitized sound effects, such as music and the like, to a speaker 26 responsive to commands issued over the network to bank controller 24. The bank controller is also connected to an electronic sign 28 that displays information, such as jackpot amounts and the like, visible to players of machines on bank 16. Such displays are generated and changed responsive to commands issued over the network to bank controller 24. Each of the other banks 18, 20 of EGMs include associated bank controllers, speakers, and signs as shown, which operate in substantially the same manner.

Ethernet hub 30 connects each of the bank controllers associated with banks 16, 18, 20 of EGMs to a concentrator 32. Another Ethernet hub 34 connects similar bank controllers (not shown), each associated with an additional bank of EGMs (also not shown), to concentrator 32. The concentrator functions as a data control switch to route data from each of the banks to a translator 36. The translator comprises a compatibility buffer between the concentrator and a proprietary accounting system 38. It functions to place all the data gathered from each of the bank controllers into a format compatible with accounting system 38. In the present embodiment of the invention, translator 38 comprises an Intel Pentium 200 MHz Processor operating Microsoft Windows NT 4.0.

Another Ethernet hub 39 is connected to a configuration workstation 40, a player server 42, and to bonus servers 44, 46. Hub 39 facilitates data flow to or from workstation 40 and servers 42, 44, 46.

The configuration workstation 40 comprises a personal computer including a keyboard, Intel Pentium Processor, and Ethernet card. It is the primary user interface with the network.

The player server 42 comprises a microcomputer that is used to control messages that appear on displays associated with each EGM. Player server 42 includes an Intel Pentium Processor and an Ethernet card.

Bonus servers 44, 46 each comprise a microcomputer used to control bonus applications on the network. Each bonus application comprises a set of rules for awarding jackpots in excess of those established by the pay tables on each EGM. For example, some bonus awards may be made randomly, while others may be made to linked groups of EGMs operating in a progressive jackpot mode. Examples of bonuses that can be implemented on the network are disclosed in co-pending application Ser. No. 08/843,411, filed Apr. 15, 1997 and assigned to the Assignee of the present application (the '411 application), which is incorporated herein by reference for all purposes. This co-pending application also describes in more detail features of the network, like that shown in FIG. 1, that may be used to implement the present invention. The '882 patent also discloses bonuses that can be implemented by bonus servers 44, 46 and a network that could be used to implement the present invention.

As used herein, the term bonus amount indicates any one award made to a player on a gaming machine resulting from a jackpot won according to the pay table on one of the EGMs and any additional amount indicated by a supplemental bonusing system. Current tax codes tie reporting regulations to this bonus amount if the award won equals or exceeds $1200. The '411 application and '882 patent include many examples of bonusing systems that can be implemented to supplement the original pay table jackpot award.

Casinos typically include electronic gaming machines (EGMs) such as slot machines and video poker machines. These games are referred to herein as the "primary game" associated with the particular gaming machine. Slot machines, for example, usually include three reels that each have a plurality of symbols printed thereon. After the player applies a wager to the machine, he or she starts play by triggering a switch that starts the reels spinning. Each reel stops at a random position and thereby presents three symbols—one from each reel. Some combinations of symbols do not pay any jackpot. Others pay varying amounts according to predetermined combinations that appear in a pay table displayed on the machine and stored in the gaming machine's programmable read-on memory (PROM).

Figure 2:
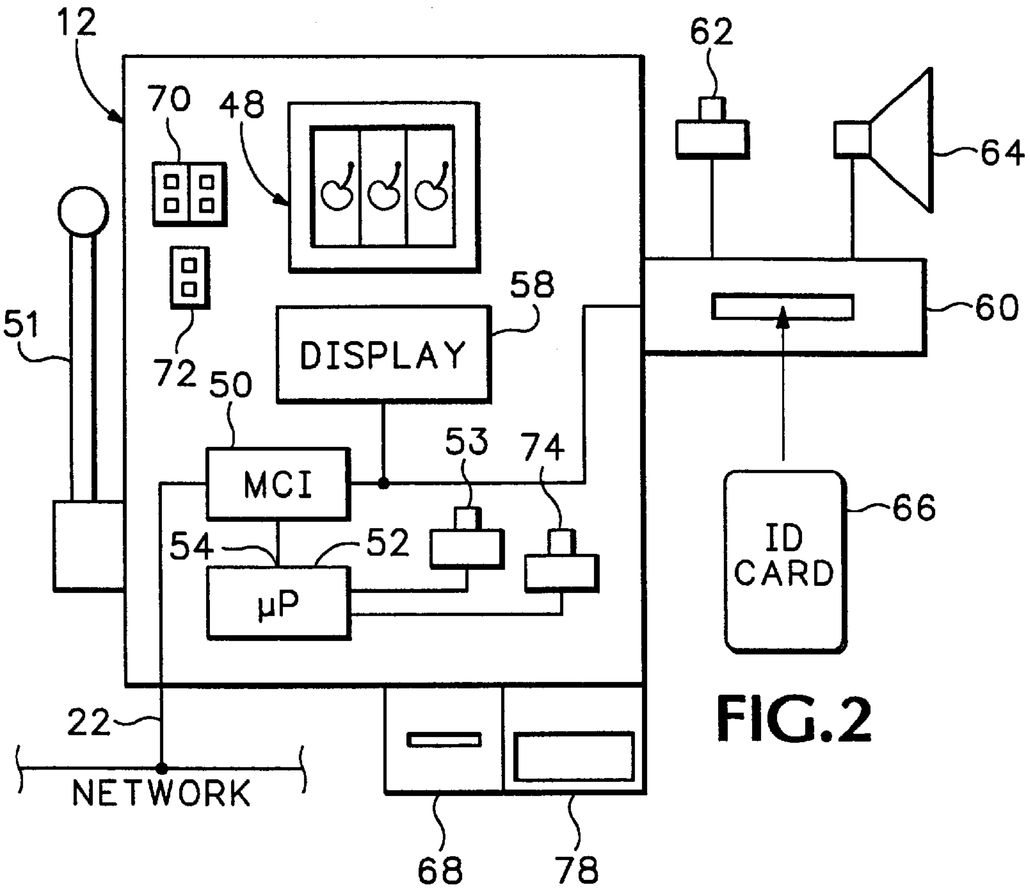
FIG. 2 is a schematic diagram of a slot machine and associated hardware implemented in accordance with the present invention.

FIG. 2 is a highly schematic representation of an electronic slot machine—typical of each of the machines in the network—that incorporates network communications hardware as described hereinafter. This hardware is described in the '882 patent, and is referred to therein as a data communications node. Preferably the network communications hardware is like that disclosed in the '411 application, namely a machine communication interface (MCI) 50. MCI 50 facilitates communication between the network, via connection 22, and microprocessor 52, which controls the operation of EGM 12. This communication occurs via a serial port 54 on the microprocessor to which MCI 50 is connected.

Included in EGM 12 are three reels, indicated generally at 48. Each reel includes a plurality of different symbols thereon. The reels spin in response to a pull on handle 51 or actuation of a spin button 53 after a wager is made.

MCI 50 includes a random access memory (RAM), which can be used as later described herein. The MCI also facilitates communication between the network and a vacuum florescent display (VFD) 58, a card reader 60, a player-actuated push button 62, and a speaker 64.

Before describing play according to the invention, description will first be made of typical play on a slot machine, like EGM 12. A player plays EGM 12 by placing a wager and then pulling handle 51 or depressing spin button 53. The wager may be placed by inserting a bill into a bill acceptor 68. A typical slot machine, like EGM 12, includes a coin acceptor (not shown) that may also be used by the player to make a wager. A credit meter 70 is a numeric display that indicates the total number of credits available for the player to wager. The credits are in the base denomination of the machine. For example, in a nickel slot machine, when a five dollar bill is inserted into bill acceptor 68, a credit of 100 appears on credit meter 70. To place a wager, the player depresses a coin-in button (not shown), which transfers a credit from the credit meter 70 to a coin-in meter 72. Each time the button is depressed, a single credit transfers to the coin-in meter up to a maximum bet that can be placed on a single play of the machine. In addition, a maximum-bet button (also not shown) may be provided to immediately transfer the maximum number of credits that can be wagered on a single play from the credit meter 70 to the coin-in meter 72.

When coin-in meter 72 reflects the number of credits that the player intends to wager, the player depresses spin button 53 thereby initiating a game.

The player may choose to have any jackpot won applied to credit meter 70. When the player wishes to cash out, the player depresses a cash-out button 74, which causes the credits on meter 70 to be paid in coins to the player at a hopper 78, which is part of machine 12. The machine consequently pays to the player, via hopper 78, the number of coins—in the base denomination of the machine—that appear on credit meter 70.

Card reader 60 reads a player-tracking card 66 that is issued by the casino to individual players who choose to have such a card. Card reader 60 and player-tracking card 66 are known in the art, as are player-tracking systems, examples being disclosed in the '882 patent and '411 application. Briefly summarizing such a system, a player registers with the casino prior to commencing gaming. The casino issues a unique player-tracking card to the player and opens a corresponding player account or record that is stored in a database of other player accounts stored on accounting system 38 (in FIG. 1). Prior to playing one of the EGMs in FIG. 1, the player inserts card 66 into reader 60 thus permitting accounting system 38 to track player activity, such as amounts wagered and won and rate of play.

Accounting system 38 is referred to herein as a host computer. It should be appreciated, however, that the host computer can be distributed on the network and could include multiple processors or memories. The player record includes the player's name and mailing address and perhaps other information of interest to the casino in connection with marketing efforts. Under the present invention, this player record is expanded to include more detailed information concerning W2-G such as tax status, country of residence, tax rate, if withholding is required, a picture of the customer and an electronic copy of his or her signature. Since players can come from different countries, different tax rates on gambling winnings could apply. Accordingly, a first tax rate and a second tax rate (and more) can be stored at the bonus server or gaming machine for application to the original bonus amount according to the methods described below. A complete record is one in which all information necessary for completing the W2-G form is included in the player record.

To induce the player to use the card, the casino awards to each player points proportional to the money wagered by the player. Players consequently accrue points at a rate related to the amount wagered. The points are displayed on display 58. In prior art player tracking systems, the player may take his or her card to a special desk in the casino where a casino employee scans the card to determine how many accrued points are in the player's account. The player may then redeem points for selected merchandise, meals in casino restaurants, or the like, which each have assigned point values.

Figure 3:
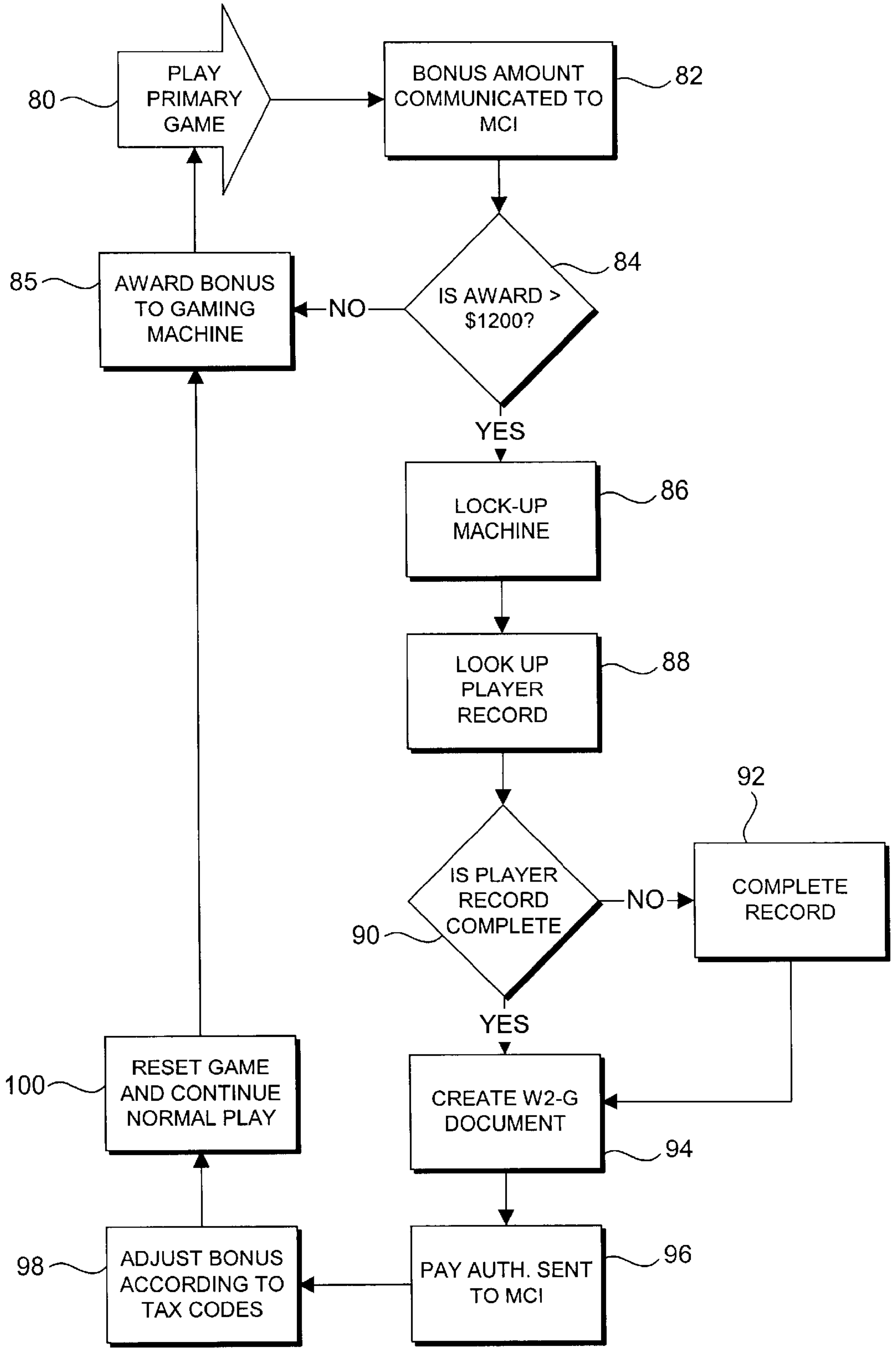
FIG. 3 is a flow diagram illustrating the method for implementing the present invention according to a preferred embodiment.

FIG. 3 shows a flow chart illustrating the steps for implementing the invention over a network. Though it is understood that adjustment of the bonus amount according to tax regulations can be implemented as a part of the bonusing systems taught in the '882 patent and '411 application, such adjustment can be implemented as a stand-alone function on an individual machine. When used as a part of the bonusing system, the MCI 50 acts as the main hardware communication element between the gaming machines 12 and the rest of the network, handling other bonuses, accounting and player tracking information.

When acting standalone, the invention uses the same MCI element but implements no other function. The system would not do the player tracking, accounting and additional bonus functions. All processes would work as described below with respect to the integrated bonusing system but there would be no access to player data from a card account. In this case a casino representative would either manually enter the customer data in a computer terminal attached to the bonus server or he would manually select a customer record stored on the computer system. All other processes would work as described above.

When implementing the invention, play is allowed to continue on the gaming machine (step 80) and the primary game is played in the normal manner. When a jackpot and any associated bonus are awarded, the total bonus amount is detected by the MCI 50 of the associated gaming machine (step 82). If the award exceeds a preestablished threshold such as the $1200 W2-G threshold set by the IRS (step 84), then the machine locks up (step 86) to prevent play of the primary game and award of the bonus. If the award does not exceed the threshold, then the bonus amount is awarded in full to the gaming machine (step 100) by either applying the amount directly to the credit meter of the machine, by applying the amount to a central player account, or by paying directly to the cash-out hopper 78 (FIG. 2).

If the amount exceeds the threshold, a first signal is sent from the gaming machine over the network to any of the bonus servers 42,44,46 handling the W2-G bonus duties. This first signal indicates either the pay table award or the total bonus amount won and can also include the identity of the player playing the winning gaming machine. In response to receiving the first signal, the bonus server looks up the corresponding player record (step 88), such that stored in the accounting system (FIG. 1), to determine whether that player record is complete (step 90). If the player record is not complete, then the amount is held in abeyance until the record is made complete (step 92). If the record is complete, a W2-G document is generated (step 94) using information from the record and the bonus amount. This W2-G document can then be filed in the manner prescribed by IRS regulations.

Once it is determined that the player record is complete enough to satisfy IRS regulations, a second signal is send back to the gaming machine's MCI 50 authorizing payment (step 96) of an adjusted bonus amount. Under the preferred embodiment of the invention, this adjusted amount is calculated either at the bonus server or at the individual gaming machine by taking into account the bonus amount originally won and any applicable tax withholding prescribed by IRS regulations (step 98). Adjusting for taxes yields a reduced amount.

In the preferred embodiment of the invention, this reduced amount is awarded directly at the machine (step 85) in a manner similar to regular bonus awards—e.g. applied directly to the gaming machines credit meter, to a central player account, or paid directly to the hopper. Upon receipt of the authorization signal, the game is reset and play can continue in the normal manner (step 100)

Once the amount to be paid is determined, the casino can program the system, in accordance with IRS requirements, to take one of several actions:

1. Immediately approve the award and make payment: This presumes the customer record is complete with signature, and the customer has agreed that he authorizes the creation of a W2-G document. This also presumes the IRS allows this. In this case, a payment authorization message is sent back through the system to the winning game's MCI 50 (FIG. 2). The MCI then sends a message to the game to add the appropriate number of credits to the game and clear the game for normal operation by sending the appropriate command. The payment amount is determined by the amount won and the withholding amount if any. If a withholding amount is specified, it is deducted from the amount to be paid. In some cases, the protocol will not contain such a command. In those situations, the MCI can include an electrical output device (not shown), typically an electromechanical relay, that is connected across the game reset switch. This contact closure simulates the turning of the keyswitch by a person and causes the game to be cleared again for normal operation. A log is made of the win on the W2-G bonus server of the amount won, winning machine number, time, date, customer name, address, etc. A separate process is run periodically to print IRS forms. This process allows the congregation of several separate wins within the same day into a single payment.

2. Require human interaction before making automated payment: In some cases, such as when only incomplete player records exist or specific IRS requirements demand it for example, a customer signature or identification process, or entry by casino personnel of the amount to be withheld must be manually completed. Once accomplished, the casino rep could then prompt the system to make payment to the gaming machine. This prompt could come from making an entry into a computer terminal attached to the bonus server or by an action at the winning game like the insertion of an authorized employee card in card reader 60 (FIG. 2). Casino personnel still must have the customer complete a W2-G form. But that action is relatively quick if the W2-G since the W2-G form is printed in response to a win exceeding the threshold amount and contains the information within the player account. Once the paperwork has been properly filled out, the casino representative then simply resets the game by turning its reset keyswitch. A credit transfer of the exact amount won is then transacted to the game's credit meter. Consequently, the need to obtain cash or tokens from the cashier's cage is eliminated.

3. Human processing of the payment: In this case a human makes payment to the player and handles any required payments, etc. Even in this case, the system will generate appropriate paperwork.

It is possible that the IRS will eventually decide that a W-2G is not required on every win but instead only on cashout. In this case, the player record, as identified by her player identification card 66 (FIG. 2), would be set to disallow cashouts. The customer could then insert coin and currency but winnings would only go to the credit meter. When the customer was finished, she'd push the cashout button. If the balance was $1,200 or more, the above payment processes would be followed. If the amount is less than $1,200, the payment is made directly from the hopper, avoiding the need for a W-2G at all.

Having described and illustrated the principles of the invention in a preferred embodiment thereof, it should be apparent that the invention can be modified in arrangement and detail without departing from such principles.). For instance, it is understood that the methods prescribed by the present invention can be used to adjust an award upwardly as well and is not intended to be limited to simply adjust the award downwardly for taxes. I claim all modifications and variation coming within the spirit and scope of the following claims.

I claim:

1. A method for adjusting the credit meter of a gaming machine responsive to a bonus amount won comprising the steps of:

- allowing play to continue on a gaming machine;
- detecting a bonus amount won on the gaming machine;
- locking up the gaming machine if the bonus amount exceeds a preestablished threshold;
- authorizing payment to the gaming machine of a reduced bonus amount, said reduced bonus amount being a function of the bonus award adjusted by an adjustment amount;
- unlocking the gaming machine after payment has been authorized; and
- awarding the reduced bonus amount to a credit meter of the gaming machine.

2. The method according to claim 1 wherein the step of authorizing payment to the gaming machine includes the steps of:

- storing a player record in a database remote from the gaming machine, said database coupled to the gaming machine over a network;
- detecting whether a complete record for the player exists in the database; and
- sending a signal to the gaming machine through the network authorizing payment if a complete record exists.

3. The method according to claim 2 further including the steps of:

- alerting casino staff if a complete record for the player does not exist in the database; and
- completing the player record.

4. The method according to claim 2, further comprising the step of printing IRS forms responsive to the detected bonus award and the player record.

5. The method according to claim 1 wherein the step of authorizing payment to the gaming machine further includes the steps of:

- storing a first tax rate in a gaming machine memory;
- alerting casino staff that a bonus award exceeding the threshold amount has been won;
- calculating the reduced bonus amount from the bonus amount and the first tax rate; and
- authorizing payment to the credit meter of the gaming machine only after interaction with the gaming machine by casino staff.

6. The method according to claim 5 wherein the step of authorizing payment to the credit meter includes the step of manually activating a switch at the gaming machine.

7. The method according to claim 6 further including the step of inserting an authorized employee security card into a card reader attached to the gaming machine.

8. The method according to claim 6 further including the step of turning a key at the gaming machine.

9. The method according to claim 6 further including making entry at a computer terminal coupled to the gaming machine.

10. The method according to claim 1 wherein the step of authorizing payment to the gaming machine includes the steps of:

- storing a first tax rate in a gaming machine memory associated with a domestic tax amount;
- storing a second tax rate in a gaming machine memory associated with an international tax amount;
- identifying a player at the gaming machine; and
- applying one of either the first tax rate or the second tax rate to calculate the reduced amount of an award over the threshold amount responsive to the player identified.

11. The method according to claim 1, further including the steps of:

- allowing play to continue on a plurality of gaming machines linked over a network;
- sending from one of the plurality of gaming machines a first signal over the network to a remote bonus server, said first signal indicating the bonus amount won and the identity of the player playing at the one gaming machine; and sending from the remote bonus server to the one gaming machine a second signal authorizing payment of the adjusted bonus amount.

12. The method according to claim 11, further including the steps of:

looking up a player record in a database responsive to the first signal;

determining whether said player record is complete; and sending the second signal authorizing payment of the adjusted amount only if the player record is complete.

13. A gaming machine network adapted to credit a tax-adjusted award to a player comprising:

a gaming machine adapted to play a primary game in which bonus amounts are awarded responsive to an outcome of the primary game;

a database coupled to the gaming machine over the network, said database having player record stored therein;

a memory within the gaming machine, said memory storing a tax rate and a threshold amount;

means for determining whether a bonus amount won on the gaming machine exceeds the threshold amount;

play deactivation means for locking up the gaming machine responsive to the bonus award exceeding the threshold amount;

means within the gaming machine for applying the tax rate to the bonus amount to yield a reduced bonus amount;

means for unlocking the gaming machine for continued play responsive to a signal submitted to the gaming machine over the network indicative of the player record stored in the database; and means for awarding the reduced bonus amount to the player.

14. The gaming machine network of claim 13, further comprising:

a credit meter associated with the gaming machine for communicating the number of credits available to the player; and means for awarding the reduced bonus amount to the credit meter.

* * * * *

UNITED STATES PATENT AND TRADEMARK OFFICE

CERTIFICATE OF CORRECTION

PATENT NO. : 6,312,333 B1
DATED : November 6, 2001
INVENTOR(S) : Acres

It is certified that error appears in the above-identified patent and that said Letters Patent is hereby corrected as shown below:

Column 6,
Line 46, "(step 100)" should read -- (step 100). --.

Column 8,
Line 62, "over a network;" should read -- over the network; --.

Signed and Sealed this

Sixth Day of July, 2004

JON W. DUDAS
*Acting Director of the United States Patent and Trademark Office*